INVENTORS
LEONARD J. POCH
REIJO A. RINNE
WILLIAM K. SPRINGFIELD
BERT E. STEVENS
WILLIAM G. SWEENEY
BY Donald R. Campbell
ATTORNEY

HIGH SPEED PACKAGING OF MINIATURIZED CIRCUIT MODULES

Filed June 1, 1965

3,312,878
HIGH SPEED PACKAGING OF MINIATURIZED CIRCUIT MODULES
Leonard J. Poch, Montrose, Pa., and Reijo A. Rinne, William K. Springfield, and Bert E. Stevens, Vestal, and William G. Sweeney, Endicott, N.Y., assignors to International Business Machines Corporation, Armonk, N.Y., a corporation of New York Filed June 1, 1965, Ser. No. 460,016
12 Claims. (Cl. 317—101)

This invention relates to the packaging of miniaturized circuit modules, and more particularly to the interconnection and packaging of high density circuit modules to achieve high circuit speeds.

The achievement of high circuit speeds in the order of one to two nanoseconds in a circuit made of largely or entirely of integrated or hybrid integrated circuit modules and associated components depends not only on the speed of the module itself, but perhaps even more so on the manner in which the modules are interconnected. Since electrical signals travel only thirteen inches in one nanosecond, it is readily seen that the manner of interconnecting the modules contributes materially to the circuit speeds and indeed may be the limiting factor. Furthermore, as the circuit modules become physically small and the circuits more dense, there is the need for the packaging arrangement—preferably a printed circuit package—to become correspondingly more dense to have the capacity to properly interconnect the modules.

An object of the invention is to provide for the new and improved packaging of high density circuit modules and associated components operating at circuit speeds of about one to several nanoseconds.

Another object is the provision of a new and improved printed circuit package for mounting and interconnecting circuit modules wherein the circuit density and circuit speed are relatively high.

Yet another object is to provide a new and improved high speed printed circuit package for circuit modules which can be manufactured economically, is reliable, and meets the serviceability requirements.

The foregoing and other objects, features and advantages of the invention will be apparent from the following more particular description of a preferred embodiment of the invention, as illustrated in the accompanying drawings.

Figure 13:
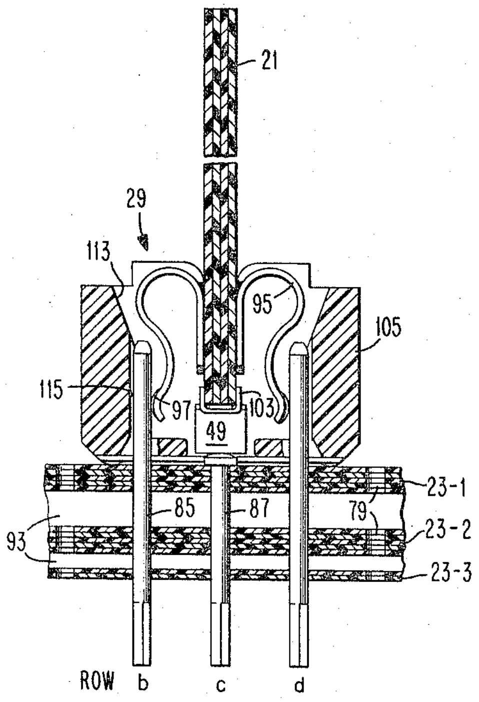
Figure 12A:
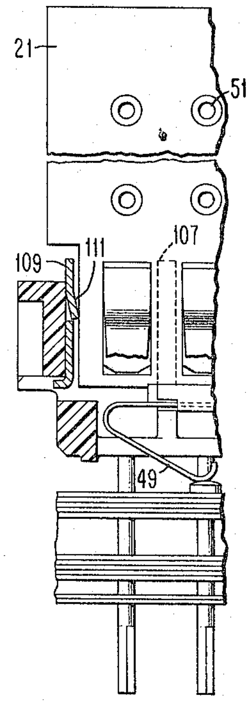
Figure 12B:
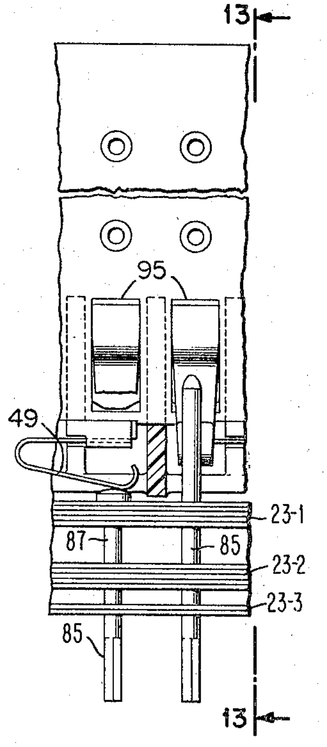
Figure 14:
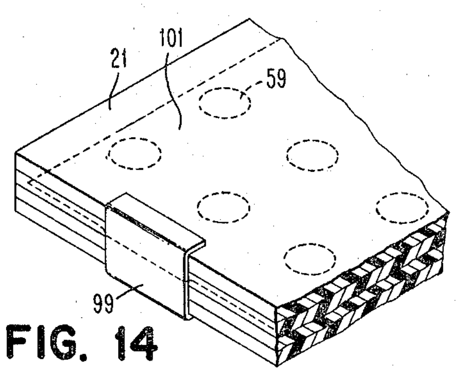
Figure 15:
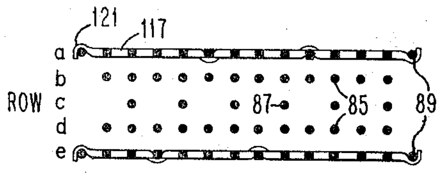
Figure 16:
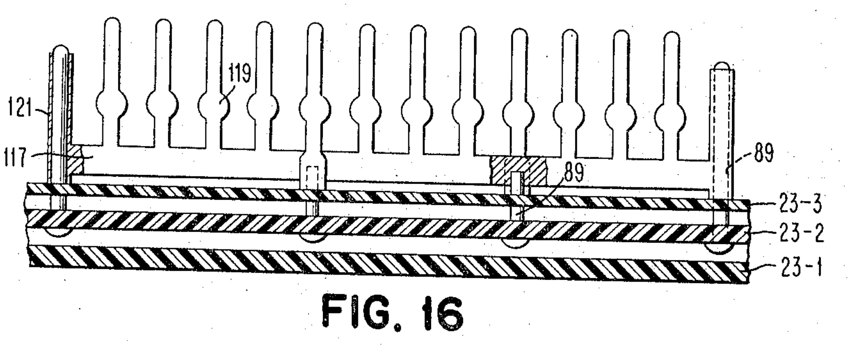
Figure 17:
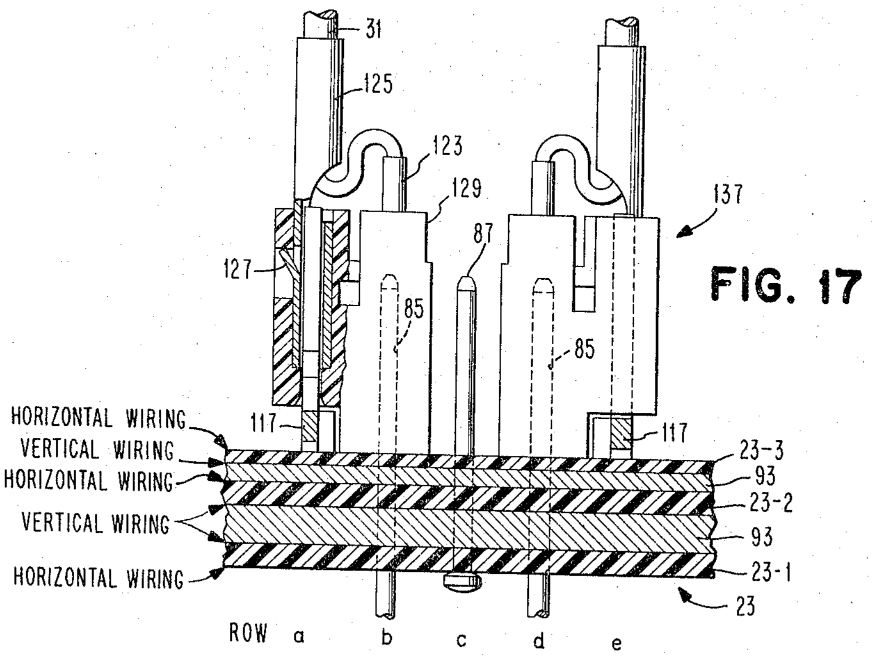
Figure 18:
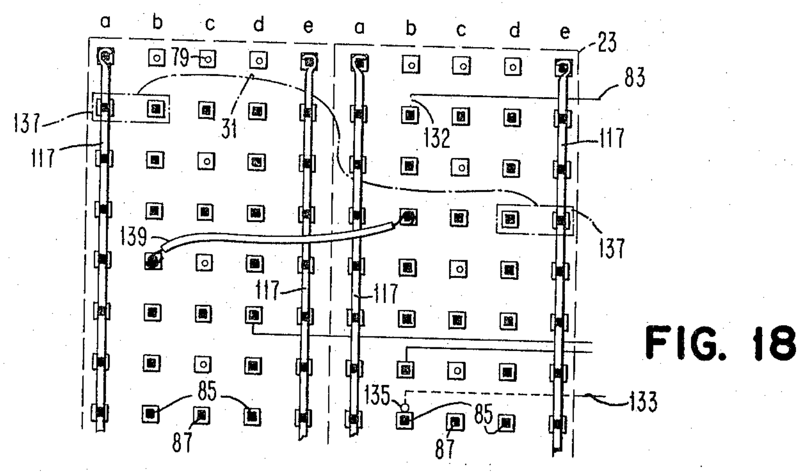
Figure 19:
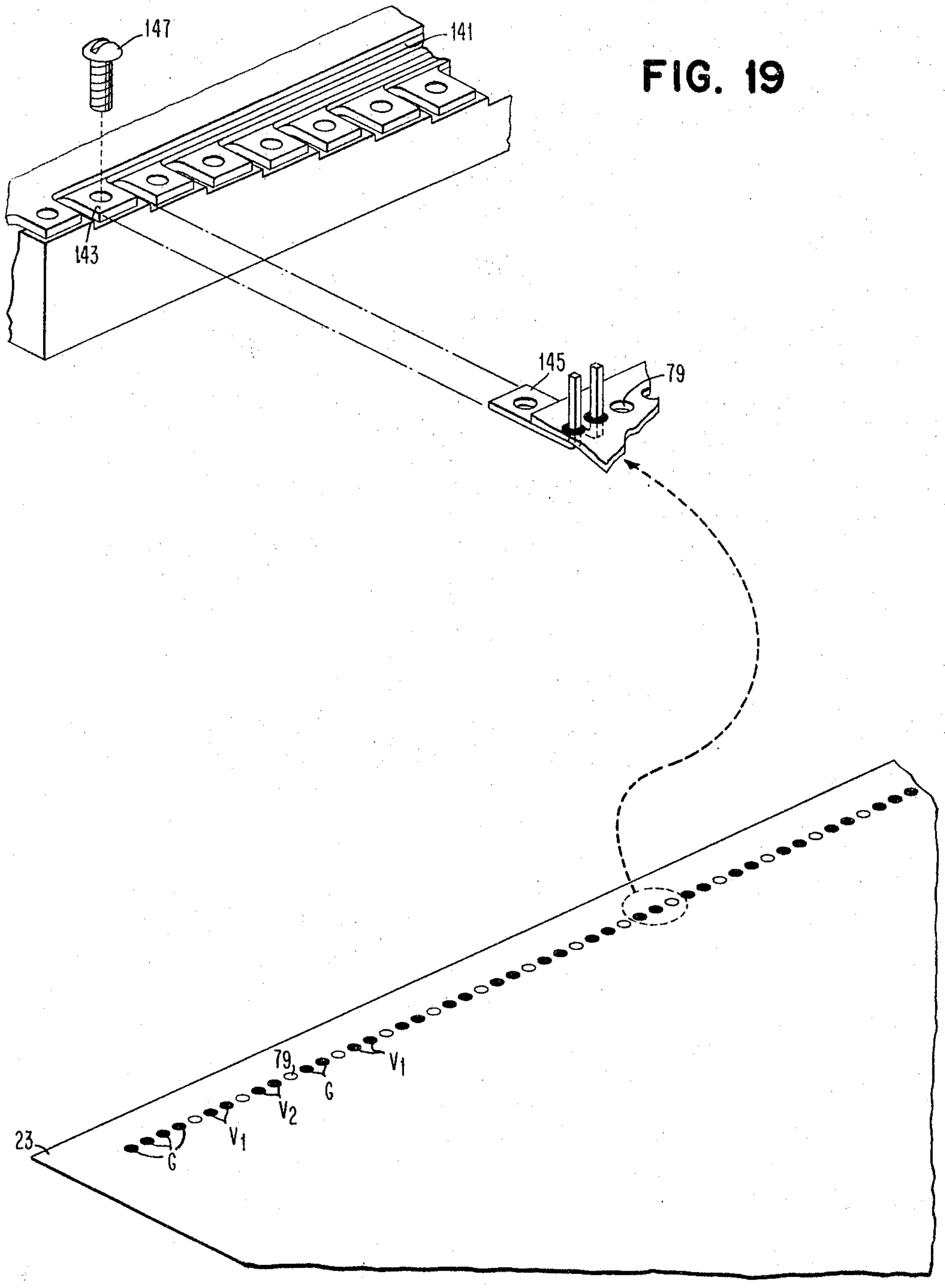

FIG. 12*a* is a longitudinal sectional view of the connector for plugging the cards onto the board, the board being shown to a slightly enlarged scale, with the voltage and ground contact springs illustrated in the relaxed position;

FIG. 12*b* is a longitudinal sectional view of the connector for plugging the cards onto the board, the board being shown to a slightly enlarged scale, with the voltage and ground contact springs illustrated in the loaded position;

FIG. 13 is a cross sectional view of the connector and board shown in FIG. 12 taken approximately on the line 13—13;

FIG. 14 is a perspective view of a small portion of a card to which a voltage and ground contact is to be connected;

FIG. 15 is a plan view of a socket position on the probe side of the board showing attached ground rakes;

FIG. 16 is a side view of the ground rake shown in FIG. 15 including a cross section of the board;

FIG. 17 is a side view of a coaxial cable connector shown plugged onto a board, portions being broken away and shown in cross section;

FIG. 18 is a fragmentary plan view of the probe side of a board showing coaxial cables, engineering change wires and wire wrapping engineering change wires; and FIG. 19 is a fragmentary perspective view illustrating laminar bus connections to the board.

Figure 1:
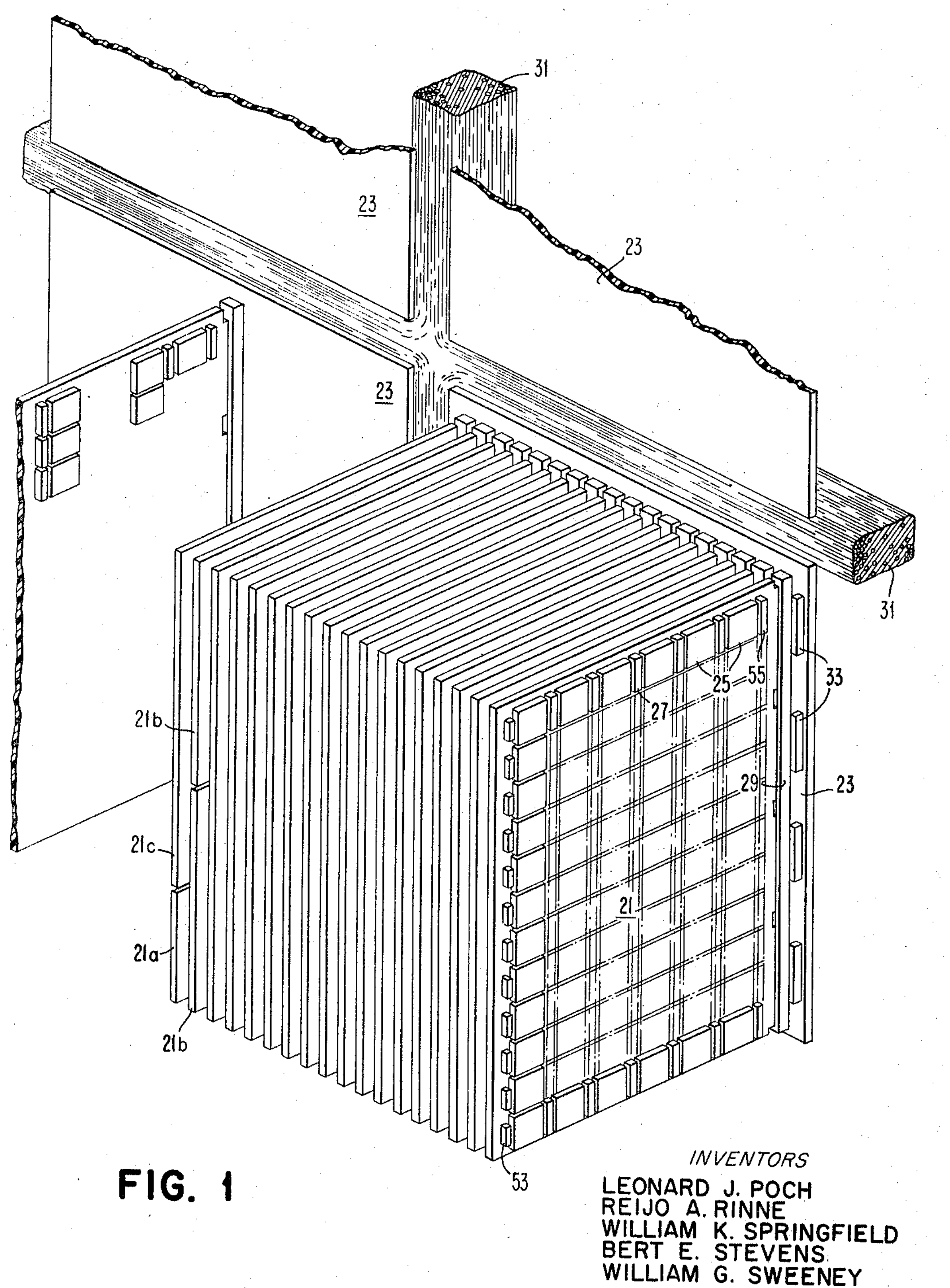
FIG. 1 is a fragmentary perspective view of the printed circuit package according to the invention showing various essential features.

Referring to FIG. 1, high speed module packaging according to the invention comprises essentially a plurality of cards 21 pluggably mounted perpendicular to a horizontally oriented interconnection board 23. High density circuit modules 25 and associated components such as R (resistance)-packs 27 are mounted on the cards 21, which are in general the component carrying vehicle. A connector socket 29 is mounted on one long end of the card and plugs onto pins not here shown on the intersection board 23. Both the cards 21 and the board 23 are multilayer printed circuits to give the required wiring density. All of the cards are the same height, but they are available in four different widths. The card 21 is four units of width wide and thus is called a 4-wide card. Cards 21*a*, 21*b*, and 21*c* are respectively a one-wide card, a 2-wide card, and a 3-wide card. The various width cards may be freely distributed on the board 23 according to the requirements at hand.

The board 23 is the basic unit, and as many boards as are needed to provide the required circuitry in a particular machine organization are mounted coplanar to one another in columns and rows as illustrated in FIG. 1. The boards are interconnected by coaxial cables 31 plugged onto pins on the back or probe side of the boards 23. The cables 31 are bound into harnesses and disposed in channels not here shown between the boards. The cables 31 are normally plugged into positions at the perimeter of the board 23 behind decoupling capacitors 33. The entire organization is mounted in a gate, not here shown.

Figure 2:
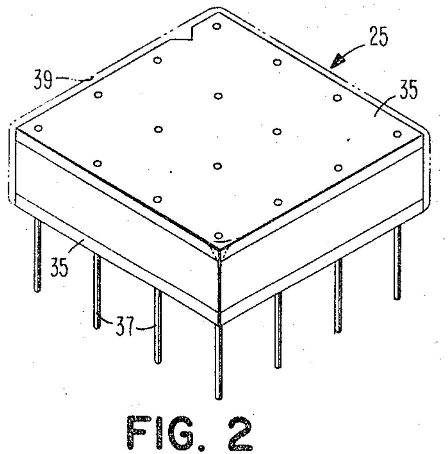
FIG. 2 is a perspective view of a circuit module.

A stacked circuit module is used to achieve high density of circuits. In FIG. 2, module 25 is an integrated or hybrid integrated type of module and comprises two square substrates 35 joined by interconnection and mounting pins 37. In the preferred form, the substrates 35 are ceramic and semiconductors are attached to the substrates and interconnected with one another by deposited circuit lines which connect to the pins 37. The circuits may be on only the top of the substrate or, preferably, on the top and bottom of each substrate. Typically the substrates are about one-half inch square and the pins 37 extend around the periphery and in the center on a .125" rectangular grid, 16 pins in all. The substrates are encapsulated and a metallic cap 39 shown here in dotted lines protects the substrates while leaving the ends of the pins 37 projecting out for assembly into plated through holes on the cards 21 and eventual soldering to them.

Figure 3:
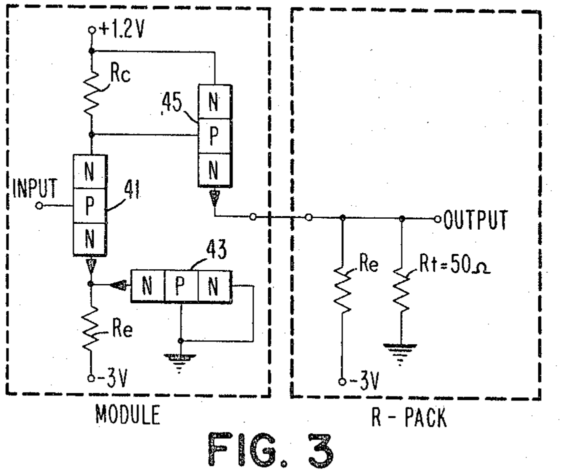
FIG. 3 is a schematic circuit diagram of a module circuit and an associated R(resistance)-pack circuit.

High speed semiconductor circuits operating in the speed range of about one to two nanoseconds are employed. The circuits have a predetermined characteristic output impedance matching the effective impedance of the circuit lines on the cards and board used to interconnect them. For instance, a current switch type of circuit with an emitter follower terminating in a resistance of 50 ohms are used. A typical circuit for a module and an associated R-pack operating on supply voltages of ground, +1.2 v. and −3 v. is shown in FIG. 3, wherein the small circles are pin positions. A current switch is provided by two transistors 41 and 43 having their emitters connected together and through emitter resistance $Re$ to the −3 v. power supply. The collector and base of transistor 43 are tied together and to ground. The input is to the base of transistor 41 whose collector is connected through collector resistance $Rc$ to the +1.2 v. supply. The output of the collector of transistor 41 is applied to the base of emitter follower transistor 45 in order to match impedances with the terminating resistance $Rt$ of 50 ohms. The R resistance-pack contains the emitter resistance $Re$ of transistor 45, which is connected to the −3 v. supply, and the terminating resistance $Rt$ which is connected to ground, the output being off of the other end of the terminating resistor. Although not here shown, it is also common to use current switch with in and out of phase emitter follower circuits available.

Figure 4:
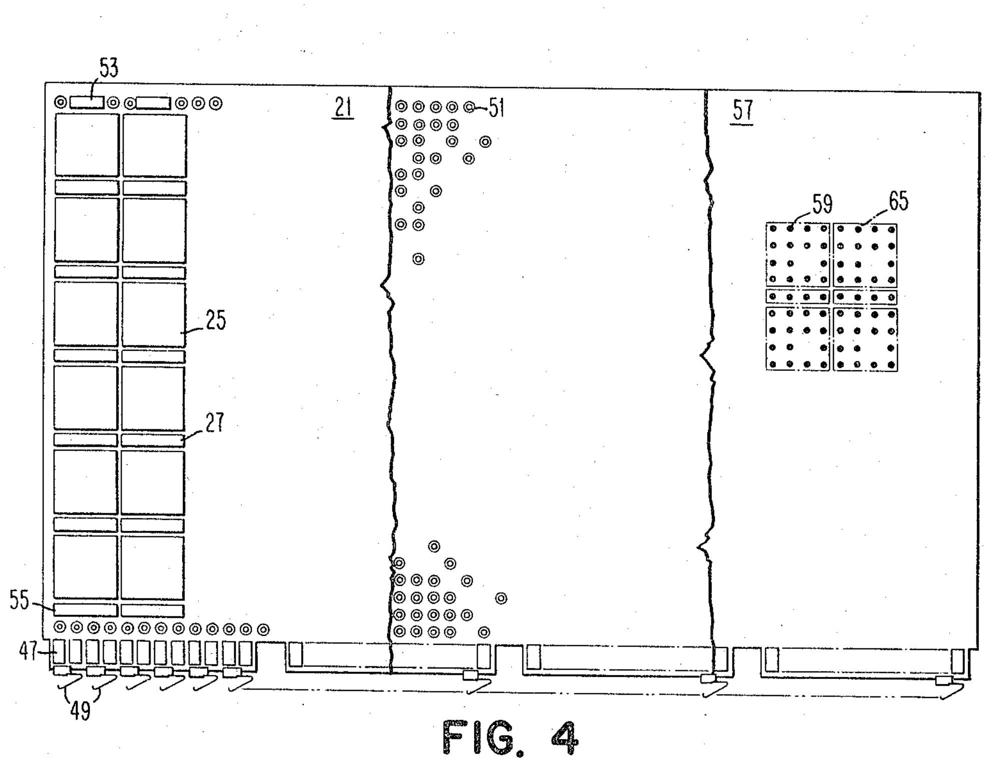
FIG. 4 is a plan view of a four-wide card, the left-hand section showing a populated card, the central section showing the external plane pattern and the right section showing a typical internal plane pattern, both to an enlarged scale.

The 4-wide card 21 shown in FIG. 4 has along one long end, on either side of the card, groups of printed contact tabs 47 to which, as will be explained in more detail later, are attached signal contact springs forming a part of the connector. Along the bottom edge of the card are connected voltage and ground contacts 49. In the preferred embodiment in each group there are twelve contact tabs 47 on either side of the card and six voltage and ground springs 49 representing a unit width of card or single socket position. The card itself (see also FIG. 5) is preferably a laminated assembly of three internal power distribution planes and two surface signal wiring planes each separated by insulating dielectric layers of for instance epoxy glass. Electrical connections between the two surface planes and to connect to the internal planes are made by a matrix of plated through holes 51 having the same spacing as the spacing of the pins on the modules 25 and other components. The modules 25 and R-packs 27 are mounted on the card 21 simply by inserting the leads through the plated through holes 51 and soldering. As here illustrated, each card width is of a size to mount three columns of six modules each together with their associated R-packs, if required. Thus, for the four-wide card, the maximum module count is 72. In addition, it is possible to mount other types of components on the card such as standard resistors or transistors (not here shown) and decoupling capacitors and resistors 53 and decoupling capacitors 55.

Figure 5:
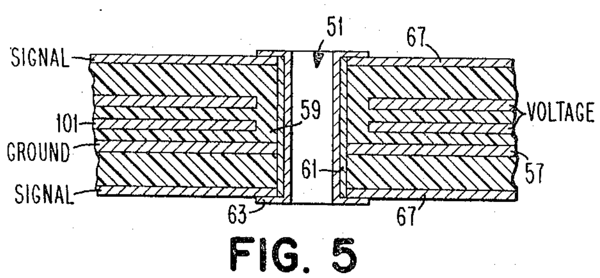
FIG. 5 is a fragmentary cross section of the card shown in FIG. 4 illustrating the various planes and a typical plated through hole connection to one of the internal planes.
Figure 6:
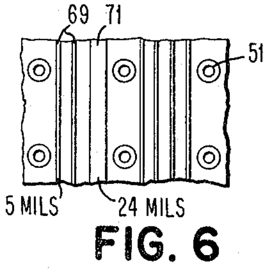
FIG. 6 is an enlarged plan view of a portion of a card illustrating a sample circuit line pattern on an external plane.

Separate internal planes are provided for the distribution of ground and the standard supply voltages needed to operate the circuits, namely, −3 v. and +1.2 v. in the given example. The internal plane pattern (such as ground plane 57) comprises a full sheet of copper having etched out circular negative lands 59 where connection is not to be made to the plated through hole. The plated through holes are formed by drilling a matrix of holes through the laminate assembly, plating with copper to form an annular ring 61 within the hole, and overcoating with immersion tin 63 including an annular land at each end of the hole on the surface planes. As illustrated in FIGS. 4 and 5, the ground plane 57 makes connection with the plated through hole. Dotted squares 65 show the module positions, and it will be observed that for each module there is one ground connection to the appropriate module pin.

Figure 7:
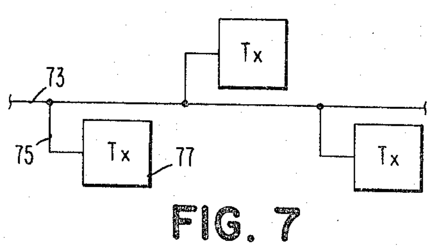
FIG. 7 is a diagram of circuit lines on an external plane illustrating stubbing.
Figure 8:
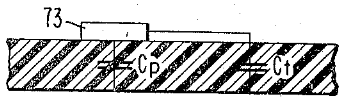
FIG. 8 is a schematic diagram illustrating stubbing off capacitances.

One of the features of the invention is that on the surface planes 67, properly designed etched printed circuit lines provide matched impedance or uniform characteristic impedance lines to interconnect the circuitry. For the high speed circuit family of the type shown in FIG. 3 having a terminating resistance of 50 ohms, both 50 ohm and 90 ohm characteristic impedance transmission lines are used. The 90 ohm lines 69 are five mils wide while the 50 ohm lines 71 and 24 mils wide. Where the plated through holes 51 are on a .125" grid, the maximum channel capacity between adjacent plated through holes is four of the five mil lines or one 24 mil line and two five mil lines. The need for the 90 ohm line is due to a printed circuit layout practice called "stubbing off." This is illustrated in FIG. 7 where main five mil line 73 has various branch lines 75 taken off at various points along its length connecting to transistors 77. This practice increases the capacitance of the lines as shown in FIG. 8 where the capacitance $Cp$ of the dielectric material in the printed circuit board underlying the main line 73 is added to the capacitance $Ct$ of the transistor due to the fact that $Cp$ and $Ct$ are in parallel. Since the impedance of the printed circuit line is inversely proportional to the square root of the capacitance, it follows that the effective impedance seen by the system approaches about 50 ohms due to increased capacitance.

Figure 9:
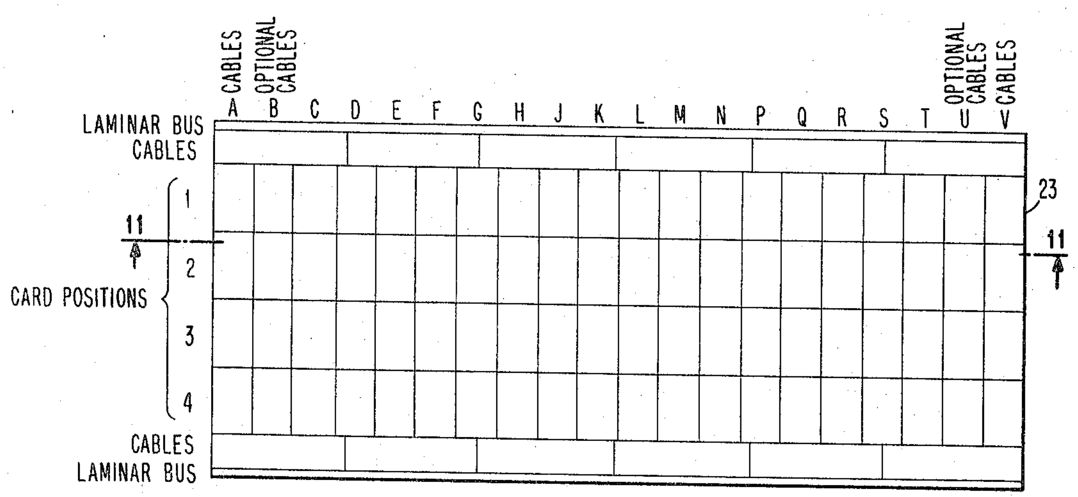
FIG. 9 is a schematic plan view of the board illustrating the various card and cable positions and the positions for the attachment of tabs from laminar buses for power distribution.
Figure 10:
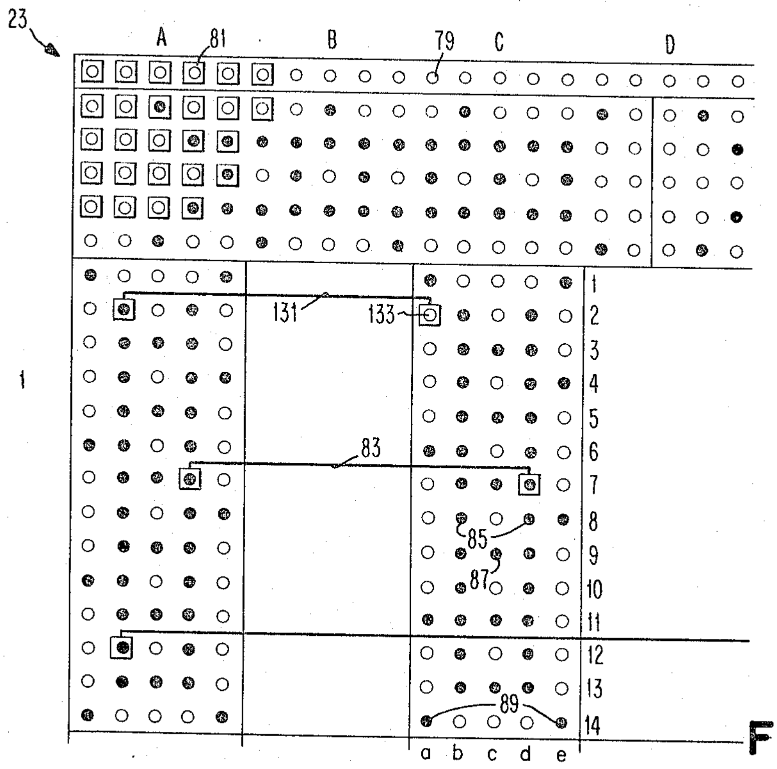
FIG. 10 is an enlarged plan view of cable and card socket positions including some illustratory signal circuit lines.
Figure 11:
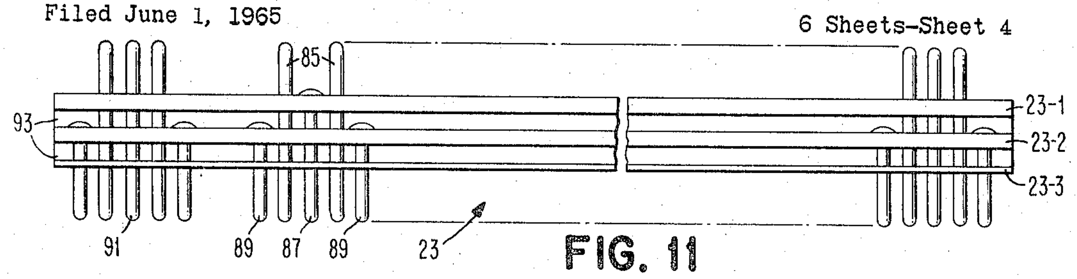
FIG. 11 is a cross section of the board taken on line 11—11 of FIG. 9 illustrating in particular the pin arrangement.

Referring to FIGS. 9–13, the board 23 is a multilayer printed circuit board having a rectangular grid of plated through holes 79 over its entire surface. In the preferred embodiment the board 23 is about 8" x 12" and the plated through holes 79 are at all intersections of orthogonally located lines spaced .125" from one another. The board is divided imaginarily into card and cable positions as shown in FIG. 9, with the top and bottom row of plated through holes being for laminar bus connections to distribute power. The board is preferably divided into 20 columns identified as A to V extending across the board, and extending down the board into four unit width card positions (or single socket positions) with a cable card position at either end. Normally the cables are plugged into the peripheral positions, six at the top and bottom and four at either side, however, the four card positions in columns B and U can optionally be used for cable connections. Preferably the 4-wide card is about 4½" high by 7" wide, and the one-wide, two-wide and three-wide cards are correspondingly smaller in width. It will be noted (FIG. 10) that each card position has five plated through holes across identified as rows *a, b, c, d,* and *e*, and 14 plated through holes down identified as 1 to 14. The cable card positions have similarly arranged groups of holes. The black plated through holes represent those having pins through them as will be explained in greater detail later. Each of the plated through holes 79 has a square land area 81 of tin-lead on the surface planes, only some of them being shown here. Printed wiring 83 on the top surface of the board extends only in the horizontal direction between the square land areas about the plated through holes and is 8 mils wide so as to have an impedance of 50 ohms to match that on the cards. Preferably the printed wiring is manufactured by exposing photoresist in orthogonal patterns on a printed circuit generator similar to that described in the article by F. W. Olson in the IBM Technical Disclosure Bulletin, volume 4, No. 7, December 1961. There are a maximum of three 8 mil wide lines per channel between adjacent plated through holes.

The interconnection board 23 is a composite board made up of two or more independently manufactured multilayer printed circuit board sections superimposed upon one another and mounted spaced from one another on a common set of pins. Each section desirably has two surface signal wiring planes and one or more internal ground and voltage distribution planes, the number of sections and the make up of each section being chosen to provide the needed wiring density for connecting the various circuits on the cards. Preferably there are three board sections identified as 23–1, 23–2 and 23–3. The first two sections are laminated assemblies of six conducting planes separated by five dielectric layers, the outer planes in each section being printed wiring signal planes while the internal planes are for ground and voltage distribution. Typically the two innermost planes are for distribution of voltages (one for −3 v., and the other for +1.2 v. for the circuit family shown in FIG. 3) while the other internal planes nearest the surface planes are for ground. The third board section 23–3 is located at the back or probe side of the board and is a laminated assembly of three conducting planes separated by dielectric layers, the two outer planes being for signal wiring while the central plane is for ground distribution. Each of the three sections has a matrix of plated through holes 79 as previously explained, and the plated through holes make connection with the internal planes or make via connections from one external plane to another in the same manner as has been explained for the plated through holes 51 in the cards 21 (FIG. 5). The construction of the internal planes is identical to that of the cards (see FIG. 4) and indeed an advantage of this printed circuit package is that common processing can be used for the cards and the board sections.

Various lengths of pins are used for mounting and interconnecting the board sections 23–1, 23–2 and 23–3 of the composite board. The pins are divided into repeating groups of pin patterns which are identical for each of the card positions on the board and for each of the cable positions. In the card positions, as for example card position C1 (FIGS. 10 and 11), there is a double row of long pins 85 extending through the plated through holes in rows *b* and *d*, positions 2 to 13, making a double row of twelve pins. Between them, in row *c*, are six headed pins 87, one in every other plated through hole, extending through the three board sections and out the probe side of the board to the same length as the pins 85. As will presently be described, the cards plug onto the pins 85, which in the completed package are connected to the signal wiring on the board sections, and the voltage and ground contacts 49 (FIG. 4) contact the headed pins 87, which terminate substantially at the surface of the board and are connected to one of the voltage or ground planes in the board sections. In rows *a* and *e* are shorter headed ground pins 89 extending only through the second and third board sections and in contact with the ground planes of each section. There are only four ground pins 89 in each of rows *a* and *e*, and as will be explained later, these provide connections for the ground sheathing of the coaxial cables 31. The patterns of pins in the cable positions, as for example cable position A1, is identical to that in the card positions with the exception that the voltage and ground pins 91 are long pins like the signal pins 85. The back or probe sides of the pins are preferably squared up so that if need be, overflow wiring or subsequently added engineering change wiring can be accomplished by wire wrapping. The back sides of the pins can of course be used for probing during testing.

The composite board 23 having a plurality of spaced board sections mounted on a common set of pins has advantages as compared to a single laminated assembly having as many planes. For the three section board here illustrated, there are three times the number of plated through holes 79 as there would be in a single laminate having as many planes, thereby providing for more interconnection possibilities. The pins serve to interconnect the boards in addition to their other functions. Manufacturing is facilitated since the various board sections are made separately, and faults can be corrected before assembly or one board section can be scraped if need be while salvaging its mate. The composite board also has more inherent stiffness than a single laminate. Although it is not absolutely necessary, the spaces between the board sections can be filled with epoxy 93 to facilitate making engineering changes in the printing wiring in a manner to be explained later. This improves the stiffness of the board, but it may still be desirable, because of the great weight of the cards having their full complement of modules and other components and because of the force needed to engage the card contacts with the board pins (especially the 4-wide card 21), to bond to the card side of the board a plastic stiffener of the general type shown in the pending patent application of K. Bostwick, Ser. No. 334,851, filed Dec. 31, 1963, for "Flat Cable Strain Relief," assigned to the same assignee as the present invention. Such a plastic stiffener (not here shown) substantially covers the board with the exception of socket openings to receive the card connector sockets 29 and the decoupling capacitor packs 33 (FIG. 1).

The connector between the cards 21, 21*a*, 21*b* and 21*c* and the board 23 comprises a socket 29 on the cards which plugs onto the pins on the board. Inverted U-shaped signal springs 95 (FIGS. 12*b* and 13) are soldered to the printed circuit tabs 47 along the bottom long end of the card in pairs on either side of the card. The contact springs 95 have a flat leg soldered to the card while the other leg is a sinuous shape having a gold contact point 97 towards its end. Along the bottom edge of the card are the previously mentioned voltage and ground contacts 49. These are in contact with the voltage or ground planes in the card. For this puropse, the internal planes are extended to the edge of the card in the area where a contact is to be attached and the entire edge of the card is plated in this area at 99 to provided a contact to the internal plane in this manner. Thus in FIG. 14 the internal voltage plane 101 contacts the edge plating 99. The contact 49 includes a reverse beam attached to a U-shaped clip 103, both being soldered along the edge of the board to the plating 99. Insulating snap-on housing 105 functions to separate the springs and mechanically align and preload them. Housing 105 is an elongated rectangular plastic molding having a central slot to receive the card and transverse separators 107 extending inwardly from the sidewalls. Retainer clips 109 at either end of the housing have struck-out lugs 111 which permit the card 21 and attached contacts to be inserted into the housing but prevent its withdrawal unless undue force is used. In the bottom of the housing are spaces through which the contacts 49 extend. During insertion the signal springs 95 slide down inclined ramps 113 on the inside of either wall of the housing onto vertical wall surfaces 115. Upon plugging the card connector socket 29 onto the pins on board 23, the long signal pins 85 enter apertures in the bottom of the housing and engage the gold contact points 97 and deflect the springs 95 inwardly to make a good pressure contact. At the same time the voltage and ground contacts 49 wipe the surface of the headed pins 87. Because of the length of the card 21 and the great number of contacts which are being engaged, it is desirable to use mechanically actuated levers not here shown to cam the cards from their relaxed position as shown in FIG. 12*a* to their loaded position as shown in FIG. 12*b*. Furthermore, to assure good contact all of the pins are gold plated.

As has been described, for each one-wide card or single socket position there are preferably 24 of the signal springs 95, 12 on either side of the card, and six of the voltage and ground contacts 49 along the edge of the card. Two of the springs 49 contact each of the internal planes of the card, i.e. two contact the ground plane, two contact one voltage plane and the remaining two contact the other voltage plane. The contacts 49 provide a low inductance path for voltage and ground interconnections without sacrificing the density of contacts provided on the sides of the card for signal interconnections. The reverse beam contacts in row *c* perform a dual function: they provide voltage and ground continuity between cards and board and they provide a return path for signals being transmitted from card to board on any of the row *b* and *d* springs. The paralleling of contacts for each voltage reduces the inductance between card and board internal planes, minimizing the effects on the voltage of sudden current demands by circuits on the card. This permits the use of high speed circuits at high density with little interference due to transient current demands. During a signal transition at the connector, all six contacts 49 behave as ground return paths which, being uniformly distributed along the edge of the card, approximate a uniform ground plane. This effect is beneficial on three counts: the impedance is low, the impedance is relatively constant with respect to different signal springs, and the cross talk is minimized.

As was mentioned previously, individual coaxial cables 31 are used to interconnect boards and are also used on the back or probe side of a particular board to provide overflow wiring and to facilitate engineering changes. For this purpose, a ground pin is provided opposite every signal pin 85 for connection to the ground sheathing of the coaxial cable. A ground rake 117 is mounted in rows *a* and *e* on the back or probe side of the board in each of the card and cable positions. The ground rake (FIGS. 15 and 16) comprises an elongated bus-like bar of metal from which extends upwardly 12 rectangular pins each of which has a terminal-retaining enlargement 119 toward the bottom. The rakes 117 are attached to the ground pins 89 in the board, of which there are four in row *a* and four in row *e*. The two central pins 89 are short stub pins while the other two at either end have the same length as the signal pins 85 and the voltage and ground pins 87. Oppositely facing semi-cylindrical ends 121 are used to attach the ground rake to the pins 89, there being two small curvatures midway of the rake to fit around the two central pins 89. The ground rake is simply slipped down over the pins 89 and soldered to them.

As best seen in FIG. 17, the pins of the ground rake 117 are slightly longer than the signal pins 85 to prevent misorientation when plugging on the coaxial cables 31. Each individual coaxial wire 31 is predeterminated with a slip-on termination 137. The central signal wire is separated from the surrounding ground sheath, and the signal wire is crimped to a barrel-like slip-on contact spring 123 while the ground sheath is soldered to another slip-on contact spring 125. Each of the springs 123 and 125 has a struck-out projection 127. The two springs are plugged into an insulating housing 129 and retained by engagement of the projections 127 in apertures in the wall of the housing. It will be noted that the bottom of the housing 129 is stepped up on one side to clear the connecting bus portion of the ground rake 117 and also to provide a visual indication as to the proper orientation of the termination when making the connection to the board.

This printed circuit package is designed for making engineering changes in the field by deletion and completion of wires on the board 23. To facilitate deletion of wires, certain rules are established for the direction of signal wiring on the surface planes of each of the board sections. In addition, only certain wiring may terminate at pins. Each of the board sections has horizontal wiring on one side (FIG. 10) and substantially vertical wiring on the other side. To make a connection to a diagonally located destination point, it is only necessary to extend the horizontal printed wiring 131 to a via plated through hole 133 which connects together the two surface planes, and then use a vertical printed wire on the other side of the board to connect to the destination. One rule to provide for deletion of printed wiring is that the horizontal wiring be on the most accessible surfaces. Thus in FIG. 17 the horizontal wiring is on the two exposed surfaces and on the surface of board section 23–2 which is adjacent the thinner section 23–3. A second rule is that only horizontal wiring may terminate at a pin, and this of course would be a signal pin. Deletion of printed wiring on the two exposed surfaces of the composite board is accomplished simply by severing, as at 132 in FIG. 18, the short transverse portion of the horizontal printed wire 83 which connects to the square land area about the plated through hole in which the pin is inserted. To delete a horizontal printed wire 133 on the buried surface of board section 23–2, a "deep delete" is made by drilling through the entire board section 23–3, as at 135, into the top of the section 23–2. A plastic filling such as epoxy material 93 fills up the spaces between the board sections to prevent a copper burr on the front surface of board section 23–3 and also to prevent cutting chips from falling between the board sections. While it has been described that horizontal wiring is on the accessible surfaces and connects to pins, with vertical wiring on the other sides, the converse arrangement is of course possible, in which case the "deep delete" is made to vertical wiring.

Engineering changes are also made by the addition of wiring to the pins projecting from the back or probe side of the composite board 23. Ordinarily, addition of wiring is made using coaxial cables 31 having at either end a slip-on termination 137 of the type shown in FIG. 17. It will be noted that the termination 137 slips down over a signal pin 85 and the pin on the ground rake 117 adjacent to it. Additional wiring may also be made using discrete wires 139 connected by wire wrapping to the desired pins.

As was previously mentioned, power is supplied to the internal voltage and ground planes of the composite board 23 by means of an extra row of plated through holes (FIG. 9) at the top and bottom edge of the board. Referring to FIG. 19, the standard voltages are distributed from power supplied to positions adjacent the board 23 by means of a laminar bus composed of a plurality of copper strips 141 laminated together with dielectric material between. Each of the copper strips 141 has an integral projecting tab 143. Connection is made between the bus tab 143 and the plated through holes 79 in the board by a removable copper tab 145 connected to the bus tabs 143 as for instance by a pressure connection employing screws 147. The removable tab 145 has one end bifurcated to provide a pair of pins which are bent at right angles to the body of the tab and inserted upwardly through two adjacent ones of the plated through holes 79 and soldered into place. Assuming that there are circuits on the cards of the type shown in FIG. 3 where there are two different supply voltages V1 and V2 (i.e. −3 v. and +1.2 v.) in addition to ground G, the pattern of power distribution from the laminar bus to the row of plated through holes 79 is as shown in FIG. 19. For each pair of adjacent V1 and V2 holes, one makes connection to the corresponding internal plane in board section 23–1 while the other makes connection to board section 23–2. The ground connections are made to all three board sections.

The present high speed printed circuit package represents a considerable extension of the technology described in the copending patent application of A. Johnson, W. McConnell, and P. Schulz, entitled "Compatible Packaging of Miniaturized Circuit Modules," Ser. No. 298,603, filed July 30, 1963, and assigned to the same assignee as the present invention, and in view of the similarity of certain constructional features, this application should be referred to for further information. The packaging of miniaturized integrated or hybrid integrated circuit modules as taught by the instant invention more particularly achieves high denstiy of circuits operating at high speeds. When packaging logic circuits for a computer or data processing system, this package achieves approximately 9 circuits per cubic inch and 1.8 nanoseconds circuit speed. This degree of density and speed is achieved by the combination of features herein described.

While the invention has been particularly shown and described with reference to a preferred embodiment thereof, it will be understood by those skilled in the art that various changes in form and details may be made therein without departing from the spirit and scope of the invention.

What is claimed is:

1. A high speed printed circuit package for miniaturized circuit modules comprising
   - a plurality of multilayer printed circuit cards each having a plurality of conductive planes,
   - a plurality of high speed, high density circuit modules and associated components mounted on said cards,
   - the circuits formed by said circuit modules and associated components typically having a characteristic output impedance,
   - a connector socket secured to each of said cards and including first contacts attached on one side of the card and second contacts attached to the edge of the cards, the contacts connected to the conductive planes of said card,
   - a multilayer printed wiring interconnection board having a plurality of conductive planes,
   - rows of pins extending through said board and selectively connected to the said conductive planes of said interconnection board,
   - said cards plugged onto said interconnection boards approximately at right angles thereto with the first and second contacts in engagement with the rows of pins,
   - at least some of the planes on said cards and board having transmission line system printed wiring the effective characteristic impedance of which substantially matches the characteristic output impedance of said circuits.

2. A high speed printed circuit package for miniaturized circuit modules comprising
   - a plurality of multilayer printed circuit cards each having a plurality of conductive surface and internal planes,
   - a plurality of high speed, high density circuit modules and associated components mounted on said cards,
   - the circuits formed by said circuit modules and associated components typically having a characteristic output impedance,
   - a connector socket secured to each of said cards and including first contacts attached to the surface planes on one side of the card and second contacts attached to the edge of the card and connected with the internal plane,
   - a printed wiring interconnection board comprising a plurality of multilayer board sections superimposed upon one another and mounted on rows of pins,
   - said board sections each having a plurality of conductive surface and internal planes selectively connected to said pins and having means for connection among the planes,
   - said cards each plugged onto said interconnection board approximately at right angles thereto with the first and second contacts in engagement with the rows of pins, and
   - the surface planes of said cards and board sections having transmission line system printed wiring the effective characteristic impedance of which substantially matches the characteristic output impedance of said circuits.

3. A construction as defined in claim 2 wherein several of said boards, each having said cards plugged thereon, are mounted coplanar to one another, and
   - coaxial cables connected between said boards for transmitting signals from one of said boards to another.

4. A high speed printed circuit package for miniaturized circuit modules comprising
   - a plurality of multilayer printed circuit cards each having conductive surface planes and at least one conductive internal plane,
   - a plurality of high speed, high density circuit modules and associated components mounted on said cards,
   - a connector socket secured to each of said cards and including U-shaped contact springs attached to the surface planes on one side of the card and reverse beam contact springs attached to the edge of the card and connected with the internal plane;
   - a printed wiring interconnection board comprising a plurality of multilayer board sections superimposed upon one another and mounted spaced from one another on repeating patterns of pins,
   - said board sections each having a plurality of conductive planes selectively connected to said pins and having means for connection among the planes,
   - said patterns of pins each including a double row projecting above the board and a central row between them,
   - said cards plugged onto said interconnection board approximately at right angles thereto with the U-shaped contacts on each of the cards in deflecting engagement with the double row of pins of one of said patterns of pins and the reverse beam contact springs in engagement with the central row of pins thereof.

5. A construction as defined in claim 4 wherein said reverse beam contact springs are attached to the edge of the card in contact with the internal plane by means of a plated area on the edge of the card which is in contact with the exposed edge of the internal plane.

6. A high speed printed circuit package for miniaturized circuit modules comprising
   - a plurality of multilayer printed circuit cards each having conductive surface planes and at least one conductive internal plane,
   - a plurality of high speed, high density miniaturized circuit modules and associated components mounted on said cards,
   - a connector socket secured to each of said cards and including first contact springs attached to the surface planes on one side of the card and second contact springs attached to the edge of the card and connected with the internal plane;
   - a printed wiring interconnection board comprising at least two multilayer board sections each having a plurality of conductive planes and a matrix of plated through holes making selective connection to the planes,
   - said board sections superimposed and mounted spaced from one another on repeating patterns of rows of pins secured in said plated through holes,
   - said patterns of pins including a double row of pins extending above the board and between them a central row terminating substantially at the surface of the board;
   - said cards plugged onto the board approximately at right angles thereto with said first set of contacts on each of the cards in engagement with the double row of pins of one of said patterns of pins and said second contact springs in engagement with the central row of pins thereof.

7. A construction as defined in claim 6 wherein said cards each have a plurality of the internal planes for voltage and ground distribution and said board has a plurality of internal planes for voltage and ground distribution, the central row of pins in each of said patterns of pins connected selectively to the board internal planes, there being at least one pair of said second contact springs connecting to each of the card internal planes, like internal planes in the board and cards being coupled, whereby continuity of ground and voltage levels is provided and whereby inductance between the board and cards is reduced, to contribute to achieving high circuit speeds.

8. A construction as defined in claim 6 wherein the board sections have at least one internal ground plane and wherein the double rows of pins also project out the other side of said composite board, and a ground rake mounted on either side of said double rows of pins on the other side of said composite board in connection with the internal ground plane to provide a ground pin adjacent to each of the pins of said double rows of pins for the connection of coaxial cables.

9. A high speed printed circuit package for miniaturized circuit modules comprising a plurality of multilayer printed circuit cards each having surface signal wiring planes and at least one internal ground plane and one internal voltage distribution plane and a matrix of plated through holes selectively making connection to the planes, a plurality of high speed, high density miniaturized circuit modules and associated components mounted on said cards in said plated through holes, a connecter socket secured to each of said cards and including signal contact springs attached to the surface planes on one side of the card and voltage and ground contact springs attached to the edge of the card and connected with the internal planes, a printed wiring interconnection board comprising a plurality of multilayer sections each having surface signal wiring planes and an internal ground plane, at least one of the sections also having at least one internal voltage distribution plane, and all of the sections having a matrix of plated through holes selectively making connection to its respective planes, said board sections superimposed and mounted spaced from one another on repeating patterns of rows of pins extending through said plated through holes, each of said patterns of pins including a double row of signal pins coupled to the surface planes and a central row of voltage and ground pins coupled to the internal planes, the connector socket of each of said cards plugged onto one of the double rows of pins on one side of the composite board in deflecting engagement with the signal contact springs and the voltage and ground springs in engagement with the corresponding central row of voltage and ground pins.

10. A construction as defined in claim 9 wherein said signal pins also project out the other side of said composite board, and said pattern of pins further includes a ground row of pins on a predetermined side of said double row of signal pins coupled to the ground internal planes to provide on the other side of said composite board a ground pin adjacent to every one of the signal pins for the connection of coaxial cables.

11. A construction as defined in claim 9 wherein said signal pins also project out the other side of said composite board, said patterns of pins each further including a plurality of ground pins on a predetermined side of said double row of signal pins coupled to the internal ground planes, and a pair of ground rakes mounted on said ground pins to provide a row of ground pins adjacent each row of the signal pins for the connection of coaxial cables.

12. A construction as defined in claim 9 wherein peripheral patterns of pins are provided, capacitor decoupling packs plugged onto the peripheral patterns of pins on the one side of the composite board while the other sides of the pins on the other side of the composite board are used exclusively for the connection of coaxial cables.

References Cited by the Applicant

UNITED STATES PATENTS

| | | |
|---|---|---|
| 2,734,151 | 2/1956 | Jacobs. |
| 2,756,482 | 7/1956 | Abramson et al. |
| 2,857,969 | 10/1958 | Johnston. |
| 3,027,538 | 3/1962 | Deakin. |
| 3,097,032 | 7/1963 | Hochheiser. |

OTHER REFERENCES

IBM Technical Disclosure Bulletin, vol. 6, No. 10, March 1964, pp. 70, 71.

ROBERT K. SCHAEFER, *Primary Examiner.*

H. O. JONES, *Assistant Examiner.*